(12) United States Patent
Kim et al.

(10) Patent No.: US 7,392,460 B2
(45) Date of Patent: Jun. 24, 2008

(54) MOBILE COMMUNICATION SYSTEM AND SIGNAL PROCESSING METHOD THEREOF

(75) Inventors: Bong Hoe Kim, Ansan-si (KR); Dong Youn Seo, Seoul (KR); Dong Hi Sim, Seoul (KR); Hyoun Hee Koo, Gwangju (KR)

(73) Assignee: LG Electronics Inc., Seoul (KR)

( * ) Notice: Subject to any disclaimer, the term of this patent is extended or adjusted under 35 U.S.C. 154(b) by 528 days.

(21) Appl. No.: 10/845,086

(22) Filed: May 14, 2004

(65) Prior Publication Data

US 2004/0268206 A1  Dec. 30, 2004

(30) Foreign Application Priority Data

May 15, 2003  (KR) .................. 10-2003-0031026

(51) Int. Cl.
*H03M 13/01*  (2006.01)
(52) U.S. Cl. .............. 714/781; 714/749; 375/267; 375/347; 370/334; 455/101
(58) Field of Classification Search ........ 714/748–751, 714/781, 16
See application file for complete search history.

(56) References Cited

U.S. PATENT DOCUMENTS

| 2003/0031158 A1* | 2/2003 | Kasturi et al. ............... 370/342 |
| 2003/0123409 A1 | 7/2003 | Kwak et al. |
| 2004/0014447 A1* | 1/2004 | Hepler et al. ............... 455/258 |

FOREIGN PATENT DOCUMENTS

| EP | 1 298 829 A1 | 4/2003 |
| WO | WO 02/091657 | 11/2002 |

OTHER PUBLICATIONS

Zheng et al., "Multiple ARQ Processes for MIMO Systems," 13th IEEE International Symposium on Personal, Indoor and Mobile Radio Communications, PIMRC 2002, New York, IEEE Sep. 15, 2002, vol. 3:1023-1026.
PCT International Search Report dated Sep. 30, 2004.

\* cited by examiner

*Primary Examiner*—Guy J. Lamarre
(74) *Attorney, Agent, or Firm*—Ked & Associates, LLP (57) ABSTRACT

A method of mobile communication including a transmitter having multiple transmitters and a receiver having multiple receivers. The method includes adding a cyclic redundancy check (CRC) code to a data block to be transmitted and spatially segmenting the data block according to a modulation scheme and a coding rate of each respective transmit antenna of the multiple antennas.

13 Claims, 7 Drawing Sheets

FIG. 1

FIG. 2A transport block

MOBILE COMMUNICATION SYSTEM AND SIGNAL PROCESSING METHOD THEREOF

CROSS-REFERENCE TO A RELATED APPLICATION

This application claims the benefit of Korean Application(s) No. 10-2003-0031026 filed on May 15, 2003, which is incorporated by reference.

BACKGROUND OF THE INVENTION

1. Field of the Invention

The present invention relates to wireless communication systems, and more particularly to a mobile communication system and signal processing method in which an indicator such as a cyclic redundancy check (CRC) code added to a data block is used to determine whether an error in transmission has occurred.

2. Background of the Invention

Multiple-input multiple-output (MIMO) wireless communication systems use multiple-element antenna arrays to increase a user capacity in rich multipath environments by exploiting the spatial properties of the multipath channel. One such system is the vertical BLAST (Bell Laboratories Layered Space-Time) system, which uses a vertically layered space-time architecture as opposed to the diagonally layered space-time architecture of a D-BLAST system. The V-BLAST system is described in "V-BLAST: An Architecture for Realizing Very High Data Rates Over the Rich-Scattering Wireless Channel" (ISSSE '98, October 1998) by P. W Wolniansky, G. J. Foschini, G. D. Golden, and R. A. Valenzuela and in "Detection algorithm and initial laboratory results using V-BLAST space-time communication architecture" (IEEE, Vol. 35, No. 1, January 1999) by the same authors, both of which are incorporated by reference.

In the above-described V-BLAST system, the ability to separate the transmitted and received data substreams depends on the slight differences in how the different substreams propagate through the environment. Hence, the V-BLAST system relies on the independence of the divided substreams launched via the plurality of transmitter antennas. This independence, however, is not always maintained resulting in data not being properly detected.

SUMMARY OF THE INVENTION

Accordingly, one object of the present invention is to solve at least the above problems and/or disadvantages and to provide at least the advantages described hereinafter.

Another object of the present invention is to preserve the integrity of a signal being transmitted from an array of transmitter antennas.

Yet another object of the present invention is to enable a mobile device to confirm the accurate detection of the signal.

To achieve these objects and other advantages in accordance with the present invention, as embodied and broadly described herein, the present invention provides a novel method of mobile communication including a transmitter having multiple transmitters and a receiver having multiple receivers and including adding a cyclic redundancy check (CRC) code to a data block to be transmitted, and spatially segmenting the data block according to a modulation scheme and a coding rate of each respective transmit antenna of the multiple antennas.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

Figure 1:
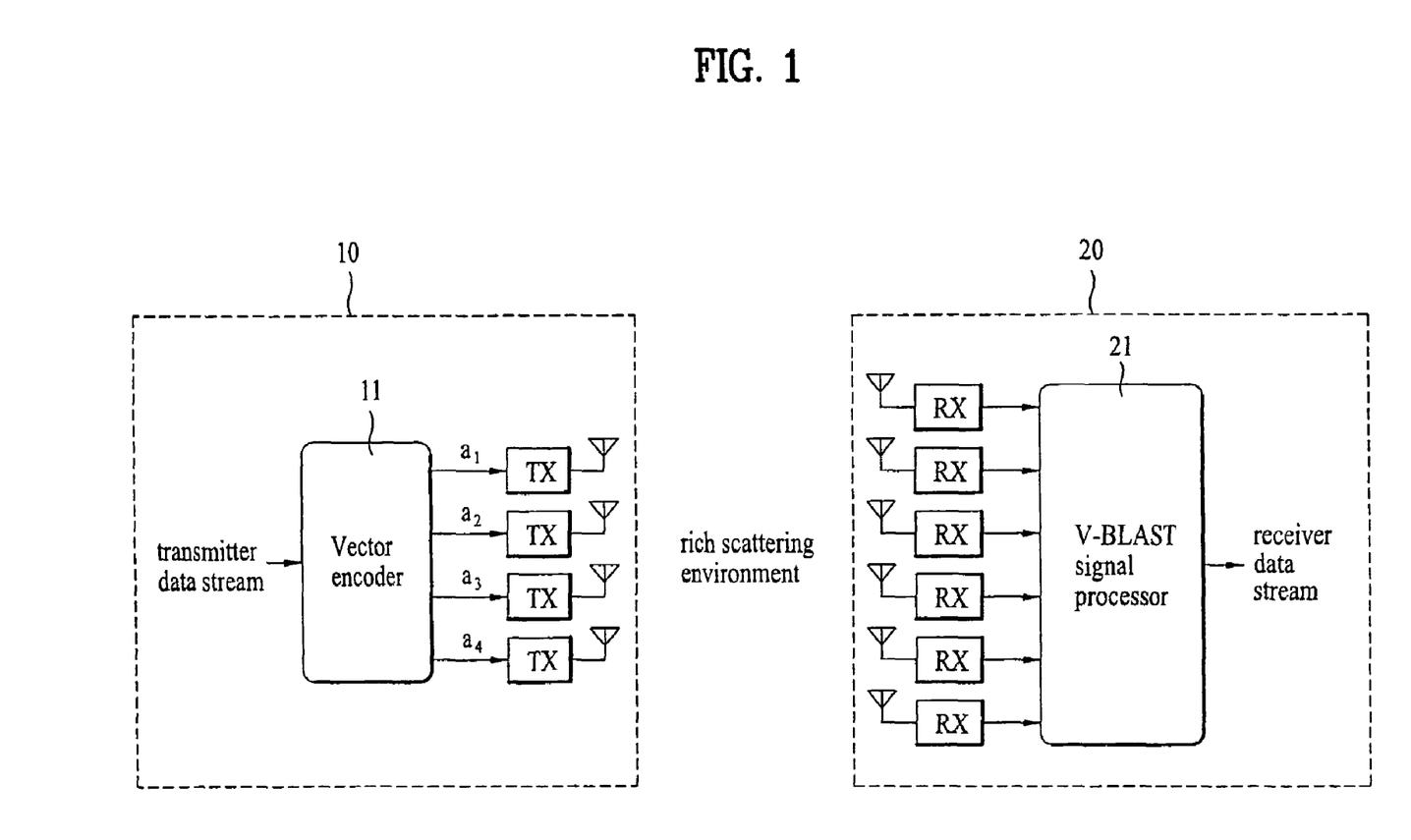
FIG. 1 is a schematic diagram of a V-BLAST wireless system.

An example of a V-BLAST wireless system is schematically illustrated in FIG. 1, in which a single data stream is divided into multiple substreams for transmission in a rich scattering (multipath) environment. The V-BLAST system treats the multiplicity of scattering paths as separate parallel subchannels, each carrying a substream of data.

Referring to FIG. 1, the V-BLAST system includes a vector encoder 11 and a V-BLAST signal processor 21 at a receiver 20. The vector encoder 11, for example as part of a fixed host 10 (e.g., a base station or Node B) or a transmitting device, is connected in parallel to M antennas for respectively transmitting a plurality of data substreams $a_1$-$a_4$. The V-BLAST signal processor 21, as part of a subscriber unit, a mobile terminal, a mobile device or a user equipment (UE) 20, for example, (hereinafter, a mobile terminal) is connected in parallel to N antennas, each for receiving the plurality of transmitted data substreams. As shown in the example of FIG. 1, the number of transmitters (TX) and transmitter antennas is four, i.e., M=4, and the number of receivers (RX) and receiver antennas is six, i.e., N=6. Nevertheless, M may be any integer greater than one and, in a vertical BLAST system, its value is assumed to be less than or equal to N.

The transmitter data stream, i.e., series data, is passed through the vector encoder 11, which includes a serial-to-parallel circuit to generate parallel data by dividing the series data into M substreams, each to be transmitted separately as a unique signal from a corresponding transmitter antenna of the fixed host 10. In doing so, the vector encoder 11 performs quadrature amplitude modulation (QAM) to output the data substreams $a_1$-$a_4$ as QAM symbol streams. Each data substream is a different signal transmitted from a different antenna without employing a space-time code, such that there is preferably no separate signal processing or code diversity required for improving transmission quality.

To receive such a transmission, the V-BLAST signal processor 21 of the mobile terminal 20 uses an algorithm, for example, to detect the data substreams individually. In detecting the data substream of a predetermined transmitter antenna, the superimposed set of data substreams $a_1$-$a_4$ received at each receiver antenna is considered. The V-BLAST signal processor 21 thus looks at all of the signals, using the algorithm to first extract the data substream having the greatest signal-to-noise (S/N) ratio and to then proceed with the remaining weaker signals, which are easier to recover once the stronger signals have been removed as a source of interference.

For the method to be effective, the independence of the data should be maintained over a mobile communication channel during the transmission stage from the transmitter and while the received signals are being processed in the mobile terminal. In reality, however, at least some degree of correlation persists among the transmitter antennas as well among the receiver antennas, such that signal independence cannot be guaranteed.

In addition, independent transmission and reception mobile communication channels are also required, but the channel independence also cannot be guaranteed. In the absence of channel independence, proper detection at the mobile host of the separate data substream of a predetermined transmitter antenna is impeded, and improper detection results in excessive error rates at the mobile host or a detection of the wrong signal. Accordingly, the V-BLAST technology does not effectively handle the environmental fluctuations in a mobile communication channel.

Further, a HS-DSCH (High-Speed Downlink Shared Channel) is preferably operated over a MIMO environment. Assuming each data stream is transmitted through a MIMO transmitter, the MIMO system can be considered as a spatial multiplexing system. In other words, multiple different data streams are simultaneously transmitted via multiple transmit antennas during one TTI (Transmission Time Interval). Currently, HS-DSCH does not consider spatial multiplexing so that a single data stream can be transmitted during one TTI.

To solve these problems, the present invention includes an algorithm, for example, in the host 10 for attaching a cyclic redundancy check (CRC) code to a data block such that the mobile terminal 20 may check the transmittal data to determine if any errors have occurred. The data is also spatially segmented according to a modulation scheme and a coding rate of a respective antenna.

In more detail, the mobile terminal 20 also includes a demodulator (not shown) included in the V-BLAST signal processor 21, which demodulates a data block transmitted from a fixed host of another mobile communication system. An error check algorithm (not shown) in the mobile terminal 20 gathers and decodes the demodulated data blocks to determine whether there was a transmission error. In checking for errors present in the transmitted data block, an interference nulling method may be used, which is achieved using a zero forcing (ZF) or minimum mean-squared error (MMSE) technique. The mobile terminal may also incorporate interference cancelling as part of its detection method.

Figure 2A:
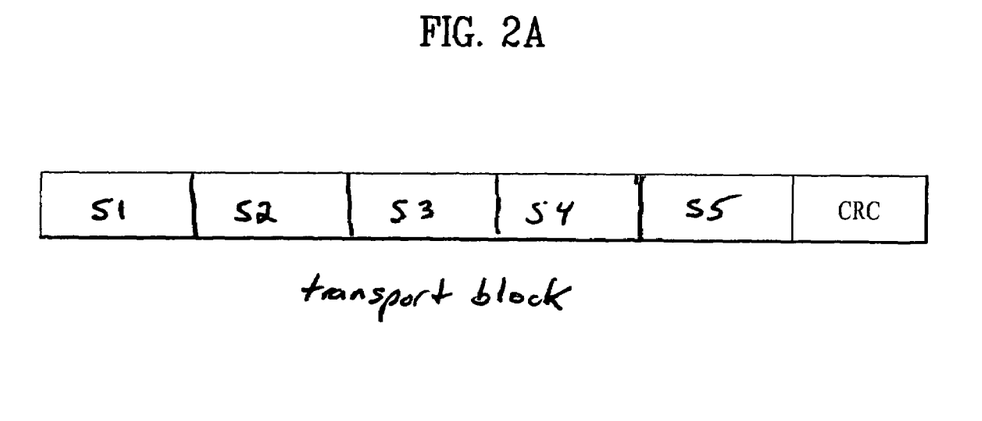
FIG. 2A is a representative diagram of a data steam to be transmitted, in which a CRC code is added in accordance with the signal processing method of the present invention.
Figure 2B:
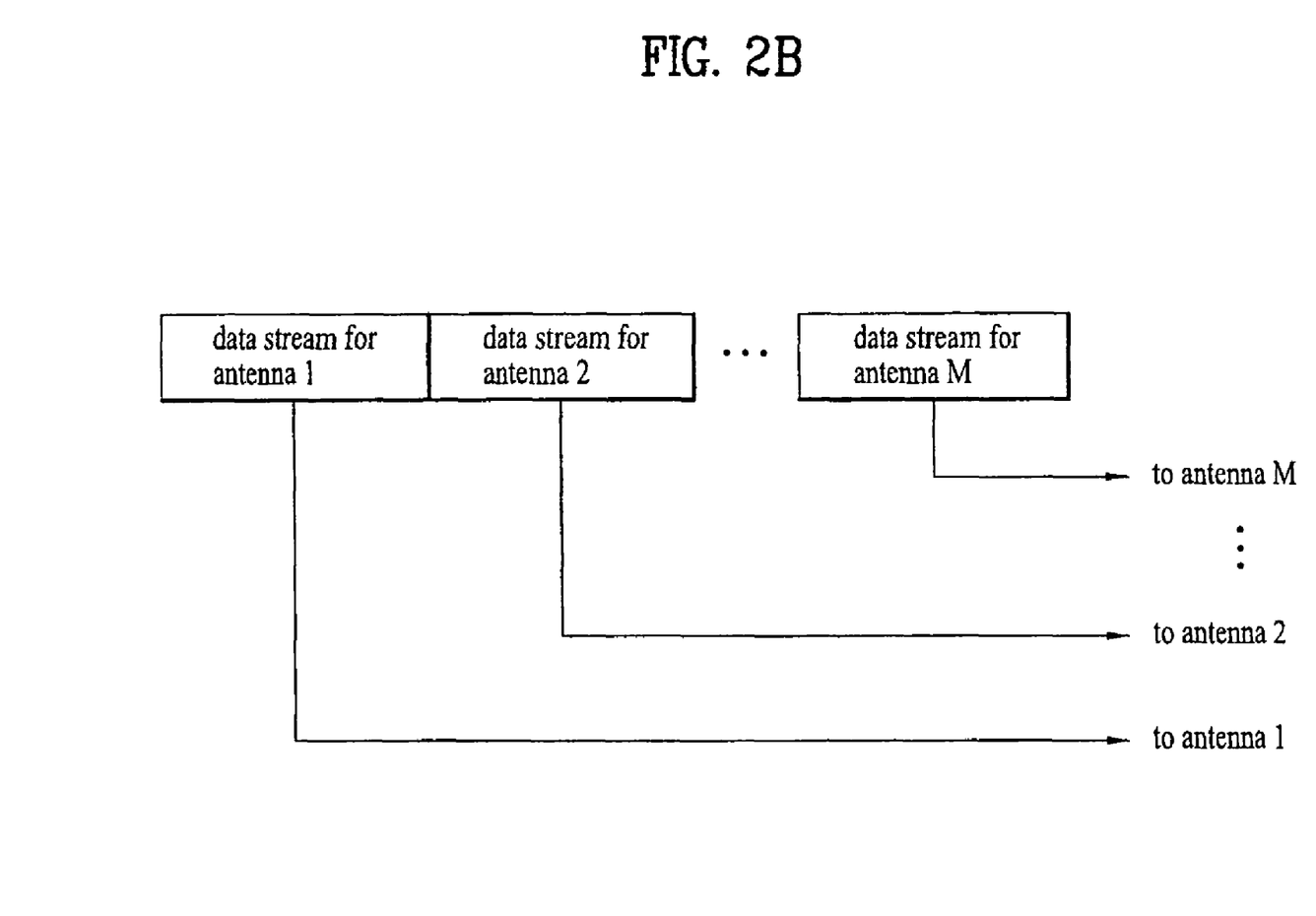
FIG. 2B is a representative diagram of a segmented data stream to be transmitted from a plurality of antennas, showing the data stream of FIG. 2A segmented in accordance with a signal processing method of the present invention.

Turning next to FIG. 2A, which illustrates a CRC attached to transport block including a stream of segmented blocks (i.e., S1, S2, S3, S4 and S5 ). FIG. 2B illustrates the segmented blocks being supplied to the respective antennas.

Note that the CRC is added to the end of the transport block in FIG. 2A and thus is transmitted from the M-th antenna in FIG. 2B. However, the CRC may be added anywhere in the transport block (e.g., at the beginning between the segmented blocks S1 and S2, etc.).

Figure 3:
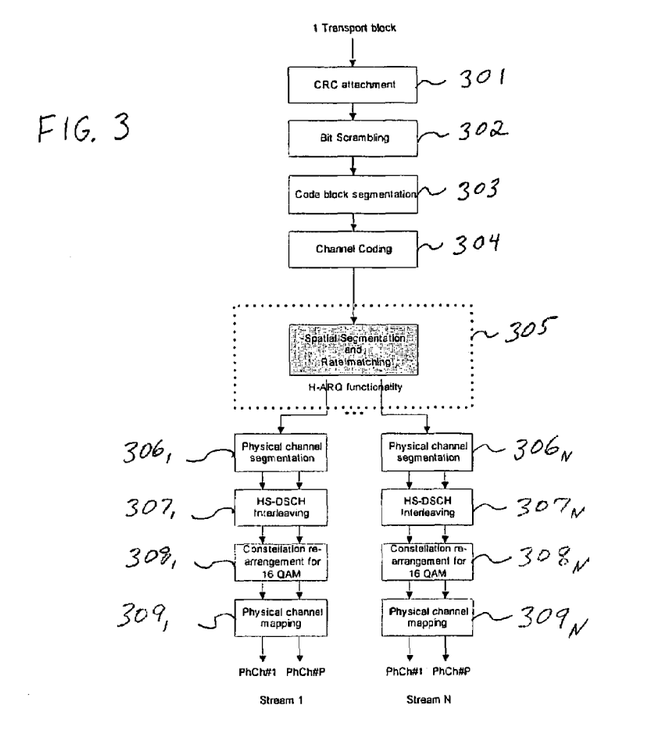
FIG. 3 is an operational flow diagram of the signal processing method of the present invention.

Turning now to FIG. 3, which illustrates an operational flow diagram according to one example of the present invention. In this example, only one transport block arrives at the multiplexing chain every TTI so that one CRC is attached to the one input transport block and the entire transport block is retransmitted during a TTI if an error occurs. Further, because only one transport block per TTI arrives at the multiplexing chain, a spatial segmentation block (discussed in more detail later) is used to segment the input block into multiple blocks for simultaneous transmission of multiple data streams. That is, after channel coding, the coded block is segmented into N streams in the spatial segmentation block, where N denotes the number of simultaneously transmitted data streams via multiple transmit antennas during one TTI. A Hybrid-ARQ functionality unit performs rate matching for a separate MCS (Modulation Code Scheme) control for each data stream. In addition, this example requires only one uplink ACK/NACK signal, because there is only one transport block. In addition, because the performance of one transport block is decided by the combined performances of the multiple streams, it is generally more difficult to determine the MCS for each stream.

As shown in FIG. 3, first, in step S301, the CRC is attached to one transport block including the stream of segmented blocks to enable error detection.

CRC attachment for the HS-DSCH transport channel may be performed using the following method. In more detail, error detection is provided on transport blocks through the Cyclic Redundancy Check (CRC). The size of the CRC is 24, 16, 12, 8 or 0 bits and what CRC size should be for each TrCH is sent from higher layers.

Further, the entire transport block is used to calculate the CRC parity bits for each transport block. The parity bits may be generated by one of the following cyclic generator polynomials, for example:

$$g_{CRC24}(D)=D^{24}+D^{23}+D^6+D^5+D+1;$$

$$g_{CRC16}(D)=D^{16}+D^{12}+D^5+1;$$

$$g_{CRC12}(D)=D^{12}+D^{11}+D^3+D^2+D+1;$$

$$g_{CRC8}(D)=D^8+D^7+D^4+D^3+D+1.$$

In this example, the bits in a transport block delivered to layer 1 are denoted by $a_{im1},a_{im2},a_{im3},\ldots,a_{imA_i}$, and the parity bits are denoted by $p_{im1},p_{im2},p_{im3},\ldots,p_{imL_i}$. Further, $A_i$ is the size of a transport block of TrCH i, m is the transport block number, and $L_i$ is the number of parity bits. $L_i$ can take the values 24, 16, 12, 8, or 0 depending on what is signalled from higher layers.

The encoding may be performed in a systematic form, which means that in GF(2), the polynomial:

$$a_{im1}D^{4i+23}+a_{im2}D^{4i+22}+\ldots+a_{imA_i}D^{24}+p_{im1}D^{23}+p_{im2}D^{22}+\ldots+p_{im23}D^1+p_{im24}$$

yields a remainder equal to 0 when divided by $g_{CRC24}(D)$, the polynomial:

$$a_{im1}D^{4i+15}+a_{im2}D^{4i+14}+\ldots+a_{imA_i}D^{16}+p_{im1}D^{15}+p_{im2}D^{14}+\ldots+p_{im15}D^1+p_{im16}$$

yields a remainder equal to 0 when divided by $g_{CRC16}(D)$, the polynomial:

$$a_{im1}D^{A_i+11}+a_{im2}D^{A_i+10}+\ldots+a_{imA_i}D^{12}+p_{im1}D^{11}+p_{im2}D^{10}+\ldots+p_{im11}D^1+p_{im12}$$

yields a remainder equal to 0 when divided by $g_{CRC12}(D)$, and the polynomial:

$$a_{im1}D^{A_i+7}+a_{im2}D^{A_i+6}+\ldots+a_{imA_i}D^8+p_{im1}D^7+p_{im2}D^6+\ldots+p_{im7}D^1+p_{im8}$$

yields a remainder equal to 0 when divided by $g_{CRC8}(D)$.

If no transport blocks are input to the CRC calculation ($M_i$=0), CRC attachment is not performed. If transport blocks are input to the CRC calculation ($M_i \ne 0$) and the size of a transport block is zero ($A_i$=0), CRC attachment is performed, e.g., all parity bits equal to zero.

The relationship between input and output of the CRC attachment block is as follows. Assuming the bits after CRC attachment are denoted by $b_{im1}, b_{im2}, b_{im3}, \ldots, b_{imB_i}$, where $B_i = A_i + L_i$. Then, the relation between $a_{imk}$ and $b_{imk}$ is:

$$b_{imk} = a_{imk} \; k=1, 2, 3, \ldots, A_i$$

$$b_{imk} = p_{im(L_i+1-(k-A_i))} \; k=A_i+1, A_i+2, A_i+3, \ldots, A_i+L_i$$

The advantages of adding the CRC to the transport block (rather than adding a CRC to each individual segmented block S1, S2, S3, S4 and S5) include at least the following:

1) If there is an transmission error in one of the segmented blocks S1, S2, S3, S4 and S5 in which the CRC is added to the end of the transport block, the entire stream of segmented blocks S1, S2, S3, S4 and S5 is retransmitted. Although, the transmission efficiency is reduced compared to when a CRC is added to each segmented block (in which only the transmitted segmented block having an error would have to be retransmitted), the overall CRC overhead requirements are reduced compared to the situation in which a CRC is added to each segmented block S1, S2, S3, S4 and S5.

2) To request data be retransmitted, a hybrid automatic repeat request (HARQ) technique may be used. HARQ is an acknowledged retransmission scheme that is used on a High-Speed Downlink Shared Channel (HS-DSCH). The HS-DSCH channel is a transport channel and a unidirectional downlink channel shared by several mobile hosts. The mobile hosts replies with an ACK if checking the CRC code indicates the transmitted block was received error free and replies with a NACK (Negative Acknowledgement) if checking the CRC indicates the transmitted block has been received in error. Upon receiving the NACK from the mobile station, the HARQ functionality automatically retransmits the transport block.

In a system according to the present invention that uses HARQ with a CRC added to the transport block (rather than a CRC added to each segmented block S1, S2, S3, S4 and S5), only one ACK/NACK is required to request a retransmission. That is, if a CRC is added to each segmented block S1, S2, S3, S4 and S5, a corresponding ACK/NACK is required for each retransmission, resulting in significantly more ACK/NACKs being required. Accordingly, when only one ACK/NACK is required per transport block, a smaller amount of data is transmitted on an uplink, which improves a peak-to-average-power ratio of the uplink.

3) Complicated and detailed telecommunication specifications define the requirements for communicating with the upper layers (e.g., the MAC layer and Radio Link Control (RLC) layer, Radio Resource Control (RRC) layer, etc.). These telecommunication specifications were developed after significant involvement with representatives from several different elements of the communication industry. Accordingly, any changes made to these upper layer requirements are likely to be significant and require a substantial amount of involvement of the telecommunications representatives. However, because the CRC is added to the transport block according to the present invention (rather than adding a CRC to each segmented block S1, S2, S3, S4 and S5), the required modifications to the upper layer specifications are significantly reduced compared to the required modifications of the specifications for the upper layers if a CRC is added to each block.

Returning again to FIG. 3. After the CRC is attached to the transport block, the data block having the attached CRC code is bit-scrambled using a predetermined code array (S302). That is, the bits output from the HS-DSCH CRC attachment are scrambled in the bit scrambler. For example, assume the bits input to the scrambler are denoted by $$b_{im,1}, b_{im,2}, b_{im,3}, \ldots, b_{im,B},$$

where B is the number of bits input to the HS-DSCH bit scrambler and the bits after bit scrambling are denoted $$d_{im,1}, d_{im,2}, d_{im,3}, \ldots, d_{im,B}.$$

Then, bit scrambling may be defined by the following relation:

$$d_{im,k} = (b_{im,k} + y_k) \bmod 2 \; k=1,2, \ldots, B$$

and $y_k$ results from the following operation:

$$y'_\gamma = 0 \; -15 < \gamma < 1$$

$$y'_\gamma = 1 \; \gamma = 1$$

$$y'_\gamma = \left( \sum_{x=1}^{16} g_x \cdot y'_{\gamma-x} \right) \bmod 2 \; 1 < \gamma \le B,$$

where $g=\{g_1, g_2, \ldots, g_{16}\} = \{0,0,0,0,0,0,0,0,0,1,0,1,1,0,1\}$, and $$y_k = y'_k \; k=1,2,\ldots,B.$$

Then, the bit-scrambled output bit array is divided into a plurality of code blocks in a same size through code clock division, for example (S303). Code block segmentation for the HS-DSCH transport channel in this example may be performed as follows:

All transport blocks in a TTI are serially concatenated. If the number of bits in a TTI is larger than Z (the maximum size of a code block in question), then code block segmentation is performed after the concatenation of the transport blocks. The maximum size of the code blocks depends on whether convolutional coding or turbo coding is used for the TrCH.

Assume the bits input to the transport block concatenation are denoted by $b_{im1}, b_{im2}, b_{im3}, \ldots, b_{imB_i}$ where i is the TrCH number, m is the transport block number, and $B_i$ is the number of bits in each block (including CRC). Further, assume the number of transport blocks on TrCH i is denoted by $M_i$ and the bits after concatenation are denoted by $x_{i1}, x_{i2}, x_{i3}, \ldots, x_{iX_i}$, where i is the TrCH number and $X_i = M_i B_i$. The following equations are then used:

$$x_{ik} = b_{i1k} \; k=1, 2, \ldots, B_i$$

$$x_{ik} = b_{i,2,(k-B_i)} \; k=B_i+1, B_i+2, \ldots, 2B_i$$

$x_{ik}=b_{i,3,(k-2B_i)}$ $k=2B_i+1, 2B_i+2, \ldots, 3B_i$

...

$x_{ik}=b_{i,M_i,(k-(M_i-1)B_i)}$ $k=(M_i-1)B_i+1, (M_i-1)B_i+2, \ldots, M_iB_i$ Segmentation of the bit sequence from transport block concatenation is performed if $X_i > Z$. The code blocks after segmentation are of the same size. Further, assume the number of code blocks on TrCH i is denoted by $C_i$. If the number of bits input to the segmentation, $X_i$, is not a multiple of $C_i$, filler bits are added to the beginning of the first block. If turbo coding is selected and $X_i < 40$, for example, filler bits are added to the beginning of the code block. The filler bits are transmitted and they are always set to 0. In addition, the maximum code block sizes in this example are:

convolutional coding: Z=504;

turbo coding: Z=5114.

Assume the bits output from code block segmentation, for $C_i \neq 0$, are denoted by $o_{ir1}, o_{ir2}, o_{ir3}, \ldots, o_{irK_i}$, where i is the TrCH number, r is the code block number, and $K_i$ is the number of bits per code block. Then, the following may be calculated.

Number of code blocks:

$C_i = \lceil X_i/Z \rceil$

Number of bits in each code block (applicable for $C_i \neq 0$ only):

```
if X_i < 40 and Turbo coding is used, then
    K_i = 40
else
    K_i = ⌈X_i / C_i⌉
end if
Number of filler bits: Y_i = C_iK_i − X_i
for k = 1 to Y_i                    -- Insertion of filler bits
    o_i1k = 0
end for
for k = Y_i+1 to K_i
    o_i1k = x_i,(k−Y_i)
end for
r = 2
    Segmentation
while r ≦ C_i
    for k = 1 to K_i
        o_irk = x_i,(k+(r−1)·K_i−Y_i)]
    end for
    r = r+1
end while
```

In one example, code block segmentation may be performed using the above method with the following specific parameters. There is a maximum of one transport block, i=1. The bits $d_{im1}, d_{im2}, d_{im3}, \ldots d_{imB}$ input to the block are directly mapped to the bits $x_{i1}, x_{i2}, x_{i3}, \ldots x_iX_i$. Then, it follows that $X_1 = B$. Note that the bits x referenced here refer only to the internals of the code block segmentation function. The output bits from the code block segmentation function are $o_{ir1}, o_{ir2}, o_{ir3}, \ldots o_{irK}$. Then, the value of Z=5114 for turbo coding is used.

Channel coding is then performed for each divided code block, using a coding or turbo coding technique (S304). A specific coding may also be employed according to the type of service required. Channel coding for the HS-DSCH transport channel may be performed in one example with the below method and assuming there will be a maximum of one transport block, i=1, and the rate of ⅓ turbo coding is used, for example.

An example of code block segmentation and channel coding is as follows. If a transport block size is 5114 bits, for example, and the data (including the CRC) to be transmitted is 6000 bits, the data is segmented into two blocks of 3000 bits each. If a channel coding of ⅓ is used, the two 3000 bit blocks are coded into 9000 bits each. The two 9000 bit blocks are then passed to the spatial segmentation and rate matching processes in step S305.

Next, in step S305, the data block is spatially segmented to be respectively transmitted to a receiving system via each transmitter antenna, allocating one segment for each of a plurality (M) of transmitter antennas. Further, each transmitter antenna has an independent modulation and coding scheme (mcs). That is, according to the present invention, a CRC is added to the transport block and then the data block is spatially segmented according to a coding rate and modulation scheme used by each antenna.

For example, assuming the first antenna on PhCh #1 uses a QPSK modulation scheme and a ½ coding rate, and the P antenna on PhCh#P uses a 16 QAM modulation scheme and a ½ coding rate. In this example, the antenna can transmit twice the amount of data (i.e., a symbol in QPSK is 2 bits and a symbol in QAM is 4 bits). Thus, according to the present invention, the two 9000 bit blocks (equaling 18000 bits) are spatially segmented into a first block of 6000 bits (i.e., ⅓ of 18000 bits) to be processed by the first channel and a second block of 12000 bits (i.e., ⅔ of 18,000 bits) to be processed by the P antenna. That is, the spatial segmentation according to the present invention is based on the modulation scheme and the coding rate.

Figure 4A:
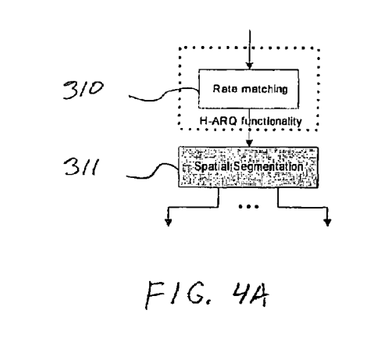
FIG. 4A is an operational flow diagram illustrating rate matching being performed before spatial segmentation according to the present invention.
Figure 4B:
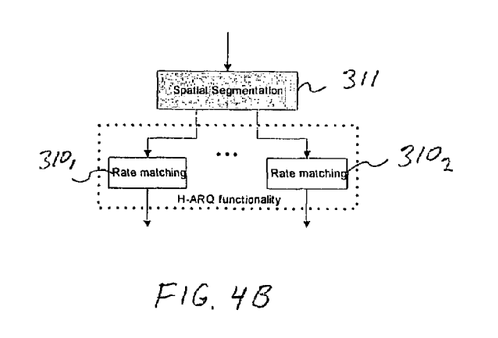
FIG. 4B is an operational flow diagram illustrating rate matching being performed after spatial segmentation according to the present invention.

Turning now to FIGS. 4A and 4B, which illustrate alternative arrangements of the processes performed in step S305. For example, FIG. 4A illustrates rate matching being performed prior to spatial segmentation, and FIG. 4B illustrates rate matching being performed after spatial segmentation. The advantages of rate matching being performed after spatial segmentation is that rate matching can be used to control the coding rate.

Thus, in FIG. 4B, the first and second spatially segmented blocks can be processed as follows. For example, if channel P uses 960 QAM and channel 1 uses 480 QPSK, 13 codes (12000/960) are processed by channel P, and 6 codes (12000/480) are processed by channel 1. Note, however, that in FIG. 4A, the coding rate can not be controlled, because rate matching is performed before spatial segmentation and thus cannot control the coding rate.

Returning to FIG. 3, signal processing is then performed on the spatially segmented data blocks for each physical channel (PhCh) for transmission. When more than one HS-PDSCH is used, physical channel segmentation divides the bits among the different physical channels. The bits input to the physical channel segmentation in this example are denoted by $w_1, w_2, w_3, \ldots w_R$, where R is the number of bits input to the physical channel segmentation block. The number of PhCHs is denoted by P.

The bits after physical channel segmentation are denoted $u_{p1}, u_{p2}, u_{p3}, \ldots, u_{pU}$, where p is PhCH number and U is the number of bits in one radio sub-frame for each HS-PDSCH, i.e.

$$U = \frac{R}{P}.$$

The relation between $w_k$ and $u_{p,k}$ is given below.

For all modes, some bits of the input flow are mapped to each code until the number of bits on the code is U. In this example, bits on the first PhCH after physical channel segmentation are:

$$u_{1,k}=w_k k=1,2,\ldots,U,$$

bits on the second PhCH after physical channel segmentation are:

$$u_{2,k}=w_{k+U} k=1,2,\ldots,U, \text{ and}$$

bits on the $P^{th}$ PhCH after physical channel segmentation are:

$$u_{P,k}=w_{k+(P-1)\times U} k=1,2,\ldots,U.$$

Figure 5:
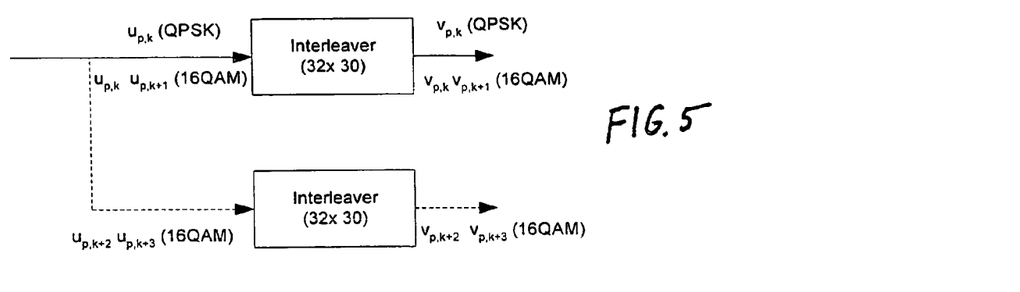
FIG. 5 is a schematic diagram of an interleaver.

After physical channel segmentation, the signal processing technique of the device 10 includes interleaving ($S307_1$-$S307_N$), and constellation rearrangement ($S308_1$-$S308_N$). Interleaving for FDD (Frequency Division Duplex) may be performed as shown in FIG. 5 separately for each physical channel. The bits input to the block interleaver are denoted by $u_{p,1}, u_{p,2}, u_{p,3}, \ldots, u_{p,U}$, where p is the PhCH number and U is the number of bits in one TTI for one PhCH. Further, for QPSK, U=960 and for 16QAM, U=1920.

The interlever may be a block interleaver and include bits input to a matrix with padding, the inter-column permutation for the matrix and bits output from the matrix with pruning. Assume the bits input to the block interleaver are denoted by $$u_{p,1}, u_{p,2}, u_{p,3}, \ldots, u_{p,U},$$

where p is PhCH number and U is the number of bits in one radio frame for one PhCH. The output bit sequence from the block interleaver may then be derived as follows:

Assign C2=30 to be the number of columns of the matrix. The columns of the matrix are numbered 0, 1, 2, . . . , C2−1 from left to right.

Determine the number of rows of the matrix, R2, by finding minimum integer R2 such that:

$$U \le R2 \times C2.$$

The rows of rectangular matrix are numbered 0, 1, 2, . . . , R2−1 from top to bottom.

Write the input bit sequence $u_{p,1}, u_{p,2}, u_{p,3}, \ldots, u_{p,U}$ into the R2×C2 matrix row by row starting with bit $y_{p,1}$ column 0 of row 0:

$$\begin{bmatrix} y_{p,1} & y_{p,2} & y_{p,3} & \cdots & y_{p,C2} \\ y_{p,(C2+1)} & y_{p,(C2+2)} & y_{p,(C2+3)} & \cdots & y_{p,(2\times C2)} \\ \vdots & \vdots & \vdots & \cdots & \vdots \\ y_{p,((R2-1)\times C2+1)} & y_{p,((R2-1)\times C2+2)} & y_{p,((R2-1)\times C2+3)} & \cdots & y_{p,(R2\times C2)} \end{bmatrix}$$

where $y_{p,k}=u_{p,k}$ for k=1, 2, . . . , U and if R2×C2>U, the dummy bits are padded such that $y_{p,k}=0$ or 1 for k=U+1, U+2, . . . , R2×C2. These dummy bits are pruned away from the output of the matrix after the inter-column permutation.

Then, perform the inter-column permutation for the matrix based on the pattern $<P2(j)>_{j\in\{0,1,\ldots,C2-1\}}$ shown in the below Table 1, where $P2_{(j)}$ is the original column position of the j-th permuted column. After permutation of the columns, the bits are denoted by $y'_{p,k}$.

$$\begin{bmatrix} y'_{p,1} & y'_{p,(R2+1)} & y'_{p,(2\times R2+1)} & \cdots & y'_{p,((C2-1)\times R2+1)} \\ y'_{p,2} & y'_{p,(R2+2)} & y'_{p,(2\times R2+2)} & \cdots & y'_{p,((C2-1)\times R2+2)} \\ \vdots & \vdots & \vdots & \cdots & \vdots \\ y'_{p,R2} & y'_{p,(2\times R2)} & y'_{p,(3\times R2)} & \cdots & y'_{p,(C2\times R2)} \end{bmatrix}$$

The output of the block interleaver is the bit sequence read out column by column from the inter-column permuted R2×C2 matrix. The output is pruned by deleting dummy bits that were padded to the input of the matrix before the inter-column permutation, i.e. bits $y'_{p,k}$ that corresponds to bits $y_{p,k}$ with k>U are removed from the output. The bits after $2^{nd}$ interleaving are denoted by $v_{p,1}, v_{p,2}, \ldots, v_{p,U}$, where $v_{p,1}$ corresponds to the bit $y'_{p,k}$ with smallest index k after pruning, $v_{p,2}$ to the bit $y'_{p,k}$ with second smallest index k after pruning, and so on.

TABLE 1

Inter-column permutation pattern for 2nd interleaving

| Number of columns C2 | Inter-column permutation pattern <P2(0), P2(1), . . . , P2(C2-1)> |
|---|---|
| 30 | <0, 20, 10, 5, 15, 25, 3, 13, 23, 8, 18, 28, 1, 11, 21, 6, 16, 26, 4, 14, 24, 19, 9, 29, 12, 2, 7, 22, 27, 17> |

The interleaver is of a fixed size: R2=32 rows and C2=30 columns, in this example.

In addition, for 16 QAM, there are two identical interleavers of the same fixed size R2×C2=32×30. The output bits from the physical channel segmentation are divided two by two between the interleavers: bits $u_{p,k}$ and $u_{p,k+1}$ go to the first interleaver and bits $u_{p,k+2}$ and $u_{p,k+3}$ go to the second interleaver. In addition, bits are collected two by two from the interleavers: bits $v_{p,k}$ and $v_{p,k+1}$ are obtained from the first interleaver and bits $v_{p,k+2}$ and $v_{p,k+3}$ are obtained from the second interleaver, where k mod 4=1.

Next, 16 QAM constellation arrangement/rearrangement is performed. In this example, 16 QAM modulated bits are assumed. Table 2 describes the operations in one example that produce the different rearrangements. Note, the bits of the input sequence are mapped in groups of 4 so that $v_{p,k}, v_{p,k+1}, v_{p,k+2}, v_{p,k+3}$ are used, where k mod 4=1.

TABLE 2

Constellation re-arrangement for 16 QAM

| Constellation version parameter b | Output bit sequence | Operation |
|---|---|---|
| 0 | $v_{p,k} v_{p,k+1} v_{p,k+2} v_{p,k+3}$ | None |
| 1 | $v_{p,k+2} v_{p,k+3} v_{p,k} v_{p,k+1}$ | Swapping MSBs with LSBs |
| 2 | $v_{p,k} \overline{v_{p,k+1}} v_{p,k+2} \overline{v_{p,k+3}}$ | Inversion of the logical values of LSBs |
| 3 | $v_{p,k+2} \overline{v_{p,k+3}} v_{p,k} \overline{v_{p,k+1}}$ | Swapping MSBs with LSBs and inversion of logical values of LSBs |

The output bit sequences from Table 2 map to the output bits in groups of 4, e.g. $r_{p,k}, r_{p,k+1}, r_{p,k+2}, r_{p,k+3}$, where k mod 4=1.

A QAM arrangement/rearrangement process disclosed in related U.S. application Ser. No. 10/834,210, filed on Apr. 29, 2000 may also be used. Note this related U.S. application Ser. No. 10/834,210 is incorporated herein in its entirety.

Next, physical channel segmentation ($S306_1$-$S306_N$) and mapping ($S309_1$-$S309_N$) are provided for multi-code transmission via a plurality (P) of physical channels PhCh#1 . . . PhCh#P. The bits input to the physical channel mapping are denoted by $r_{p,1}, r_{p,2}, \ldots, r_{p,U}$, where p is the physical channel number and U is the number of bits in one radio sub-frame for one HS-PDSCH. The bits $r_{p,k}$ are mapped to the PhCHs so that the bits for each PhCH are transmitted over the air in ascending order with respect to k.

Figure 6:
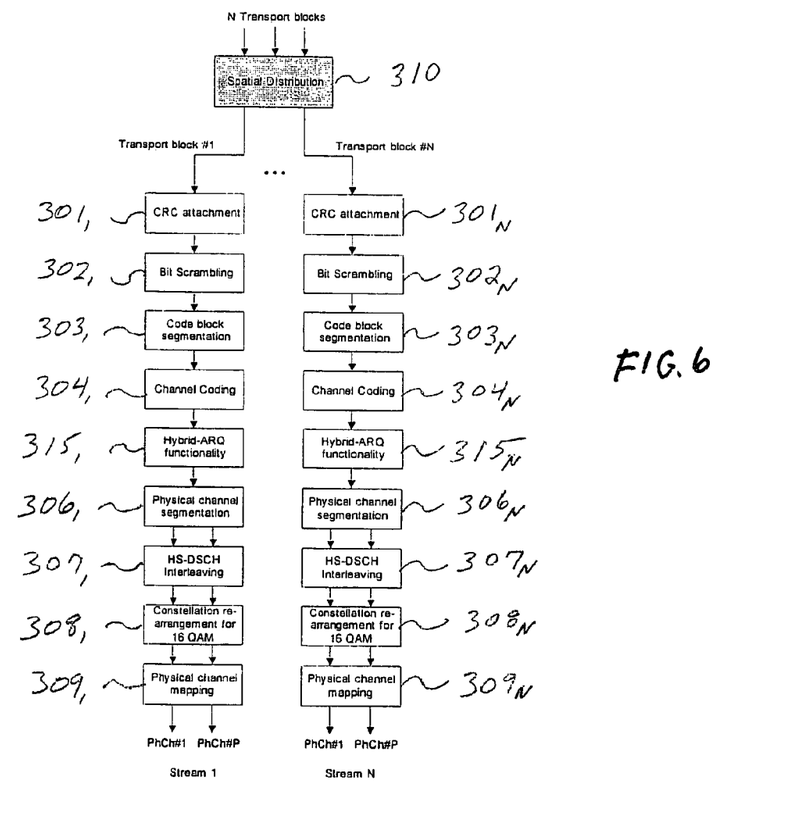
FIG. 6 is an operational flow diagram of another signal processing method of the present invention.

Returning again to FIGS. 4A and 4B. In FIG. 4A, spatial segmentation is processed after rate matching. The number of bits transmitted in the physical channel during a TTI is dependent on the modulation scheme and the number of multicodes of each stream. A higher layer selects the modulation scheme and the number of multicodes of each stream based on the CQIs (Channel Quality Indicator) reported per stream. Then, a rate matched data block is to be segmented in proportion to the ratio of the number of bits per stream.

transport blocks arrive at the multiplexing chain every TTI, where N denotes the number of simultaneously transmitted data streams. Thus, each segmented block has a separate attached CRC, which enables independent retransmission control. Then, a spatial distribution block 310 distributes the received segmented blocks into the N branches, and each segmented block goes through the same multiplexing chain for HS-DSCH as in FIG. 3. Further, because only the erroneous segmented block of the transport block (rather than all of the segmented blocks) has to be retransmitted, the retransmission process is efficiently performed. However, the uplink ACK/NACK signal per stream is needed for the retransmission process. From the viewpoint of the CQI definition, a same CQI mapping table can be used for each data stream. In addition, after the spatial distribution block 310, the multiplexing chain can be used in multiple without modifications. However, the amount of information required for the HS-DSCH transmission is increased N times.

Next, the features of each multiplexing alternative shown in FIGS. 3, 4A, 4B and 5 and the required signaling between a Node B and UE is summarized in the below Table 3.

TABLE 3

Signaling aspects of multiplexing chain alternatives for HS-DSCH in MIMO

| | | Signaling Increasement | | | | | |
|---|---|---|---|---|---|---|---|
| | | Downlink | | | | Uplink | |
| Mux chain | | Channelization code set | Modulation scheme | Transport block size | HARQ related | CQI | ACK/NACK |
| (FIG. 3) Alt. A (1 TrBlk) | (FIG. 4A) Ex. 1 | xN | xN | x1 | x1 | xN | x1 |
| | | Separate rate control (Code rate is commonly controlled over all streams.) | | | | | |
| | (FIG. 4B) Ex. 2 | xN | xN | xN* | x1 | xN | x1 |
| | | Separate rate control (Code rate is separately controlled for each stream.) | | | | | |
| | | (* The number of input bits to each rate matching block is transmitted for each stream.) | | | | | |
| (FIG. 6) Alt. B (N TrBlk) | | xN | xN | xN | xN | xN | xN |
| | | Separate rate control (Code rate is separately controlled for each stream.) Separate retransmission control | | | | | |

Because a transport block goes through one rate matching block, the code rates of all streams end up being the same. That is, the modulation scheme and the number of multicodes can be separately controlled per stream but the code rate can't be separately controlled per stream in FIG. 4A. In this example, channelization code set and modulation scheme per stream, and a transport block size are signaled from a higher layer. Single HARQ related information is sufficient as in current HSDPA.

In FIG. 4B, spatial segmentation is processed before rate matching. A higher layer selects the modulation scheme and the number of multicodes of each stream. In addition, a higher layer informs the physical layer of the number of input bits to each rate matching block. Because rate matching is performed separately, the code rate can be controlled separately for each stream. Further, the transport block size is induced from the sum of segmented bits. In this example, the channelization code set, modulation scheme and the number of input bits to the rate matching block are signaled from a higher layer. Further, single HARQ related information can be shared by all the streams.

Turning next to FIG. 6, which illustrates an alternative arrangement of the process in FIG. 3. In this alternative, N The present inventors also performed link level simulations and measured the throughput to compare both alternatives shown in FIGS. 3 and 6. The alternatives were applied to a Code Re-use (CR) MIMO transmitter and VBLAST receiver with 4 Tx and 4 Rx antennas.

Figure 7:
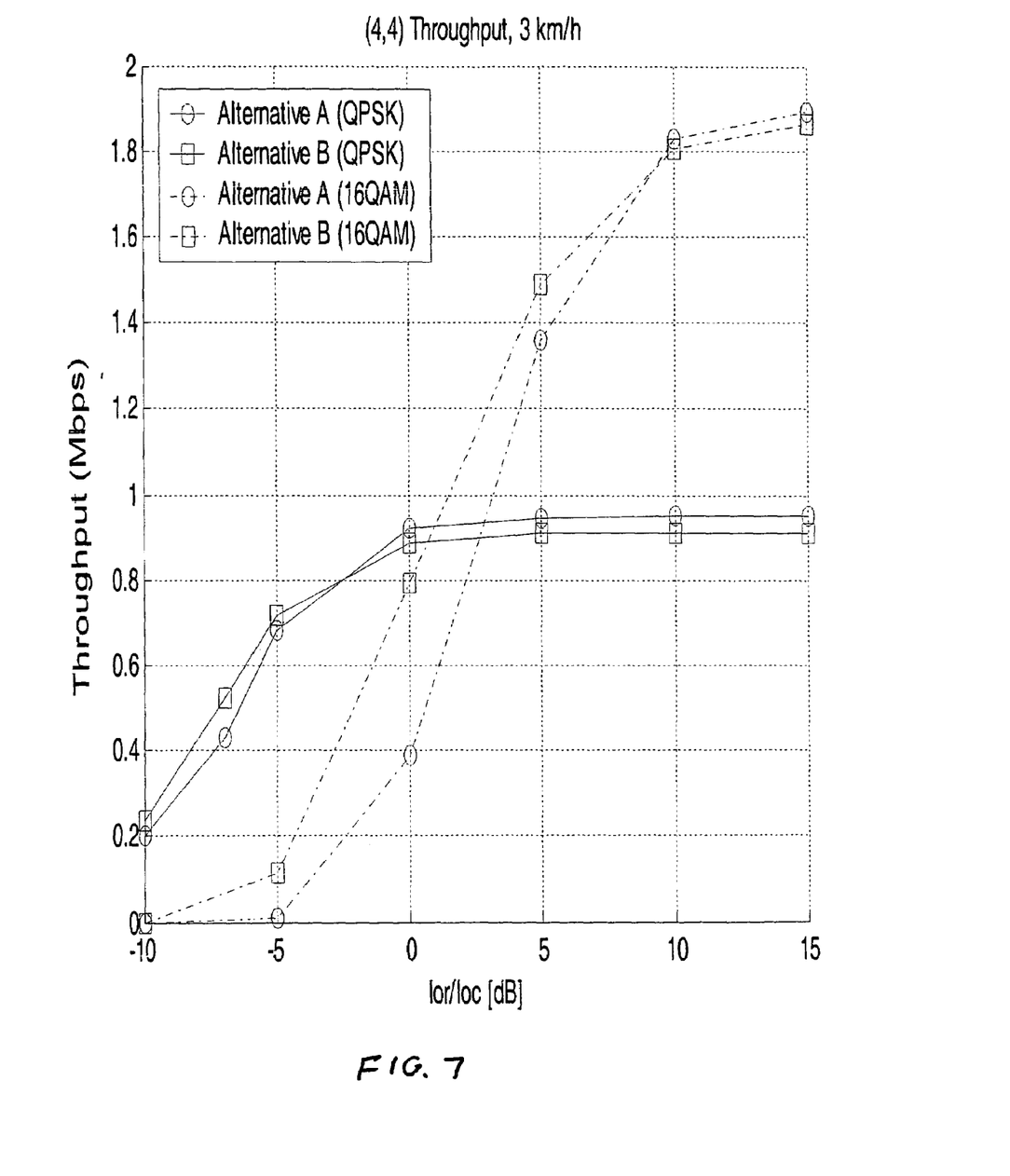
FIG. 7 is a graph illustrating results of a link level simulation according to one example of the present invention.

The following simulation parameters were used in a first example:

| | |
|---|---|
| Spreading factor | 16 |
| Number of multi-codes | 1 |
| Frame length | 2.0 ms (3-Slot) |
| $E_c/I_{or}$ | 75% |
| Fading model | 1 path Rayleigh (3 km/h UE speed) |
| Correlation model | IID |
| Channel estimation | Perfect |
| CRC length | 24 bits/transport block |
| Modulation | QPSK, 16QAM (Fixed) |
| Coding rate | ½ (Fixed) |
| Max Retransmission | 5 |
| HARQ combining scheme | CC |

FIG. 7 illustrates the throughputs for alternative A (in FIG. 3) and alternative B (in FIG. 6) for both QPSK and QAM. As shown, the independent retransmission control available in alternative B may preferably provide throughput gains. In a high geometry region, the retransmission will not be as frequent and thus the throughput difference is small. Further, as shown in FIG. 7, the effect of CRC overhead on throughput in this example is small.

In addition, if MCS control over each data stream is used, a scheduler selects the MCS based on a FER (Frame Error Rate) target. If the FER target for the MCS selection is low enough (e.g. <10%), the operating range of selected MCS would be in a high geometry region, so that the performance difference appears negligible.

In a second simulation example, the following simulation parameters were used.

| | |
|---|---|
| Spreading factor | 16 |
| Number of multi-codes | 1 |
| Frame length | 2.0 ms (3-Slot) |
| $E_c/I_{or}$ | 75% |
| Fading model | 1 path Rayleigh (3 km/h UE speed) |
| Correlation model | i.i.d. |
| Channel estimation | Perfect |
| CRC length | 24 bits |
| Modulation | QPSK, 16QAM (Fixed) |
| Code rate | ½, ¾ (Fixed) |
| Max Retransmission | 10 |
| HARQ combining scheme | CC |

Figure 8:
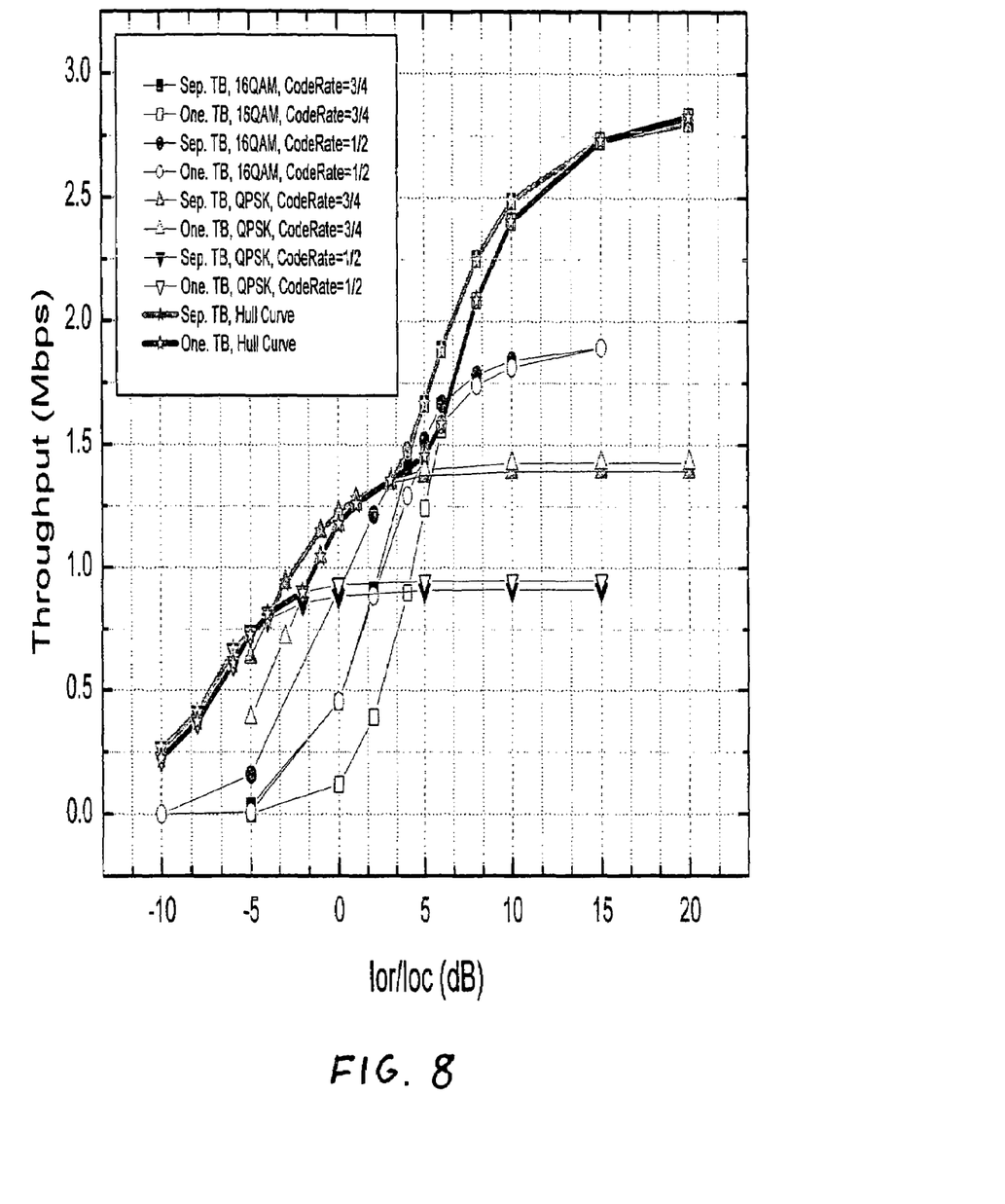
FIG. 8 is a graph illustrating results of a link level simulation according to another example of the present invention.

FIG. 8 shows the throughputs of both alternatives in FIGS. 3 and 6 in this second simulation example. Assuming a MCS that maximize the throughput in each geometry, the hull curves show that the second alternative in FIG. 6 (separate transport block) performs slightly better than the first alternative in FIG. 3 (one transport block). There is also a slight performance gain in the second alternative.

Accordingly, in a MIMO wireless communication system according to the present invention, to preserve the integrity of a signal being transmitted from an array of transmitter antennas at the transmitting party, the receiving party confirms the accurate detection of the signal of a transmitter antenna of the array by sending a corresponding ACK or NACK message to the transmitting party. It should be appreciated that such a MIMO wireless communications system includes a V-BLAST system, a per-antenna rate control (PARC) system, a per-stream rate control (PSRC) system, and the like. The data blocks including the CRC are also spatially segmented according to the present invention thereby optimizing the transmission process.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Further, the present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of transmitting data by a transmitter having multiple antennas, comprising:
   adding a cyclic redundancy check (CRC) code to anywhere in a transport block to be transmitted;
   performing rate matching on the transport block after the CRC is added;
   spatially segmenting the CRC-added transport block into at least two data streams according to a modulation scheme and a coding rate used by a respective antenna; and
   transmitting the segmented transport block via each of the multiple antennas.

2. The method of claim 1, further comprising:
   code segmenting the transport block to fit within a transport block size of a physical channel; and
   channel coding the code segmented transport block according to a coding rate.

3. The method of claim 1, wherein the step of adding the CRC code to the transport block enables independent transmission control.

4. The method of claim 3, wherein the independent retransmission control is performed by a hybrid automatic request (H-ARQ) scheme.

5. A mobile communication apparatus having multiple antennas, comprising:
   an error control unit configured to add a cyclic redundancy check (CRC) code to anywhere in a transport block to be transmitted;
   a rate matching unit configured to perform rate matching on the transport block after the CRC is added;
   a spatially segmentation unit configured to spatially segment the CRC-added transport block into at least two data streams according to a modulation scheme and a coding rate used by a respective antenna.

6. The apparatus of claim 5, wherein the apparatus retransmits the transport block upon receiving a Hybrid Automatic Repeat Request (HARQ) from the receiving apparatus.

7. The apparatus of claim 5, further comprising:
   a code segmenting unit configured to code segment the transport block to fit within a transport block size of a physical channel; and
   a channel coding unit configured to code the code segmented transport blocks according to a coding rate.

8. The apparatus of claim 5, where the error control unit is a first algorithm configured to add the CRC code to the transport block to be transmitted and the spatially segmentation unit is a second algorithm configured to spatially segment the data block according to the modulation scheme and the coding rate.

9. A method of transmitting data by a transmitter having multiple antennas, comprising:
   adding a cyclic redundancy check (CRC) code to anywhere in each of multiple transport blocks to be transmitted;
   performing rate matching on each of the transport blocks after the CRC is added;

spatially segmenting each of the CRC-added transport blocks into at least two data streams according to a modulation scheme and a coding rate used by a respective antenna; and transmitting the segmented transport blocks via multiple antennas.

10. A method of transmitting data in a multiple input, multiple output (MIMO) system, the method comprising:

spatially segmenting multiple transport blocks according to a modulation scheme and a coding rate of respective antennas:

adding a cyclic redundancy check (CRC) code to each of multiple transport blocks to enable independent retransmission control of each of the multiple transport blocks transmitted via multiple antennas, wherein the CRC code is added anywhere in each transport block; and performing rate matching on each of the multiple transport blocks after the CRC is added, wherein the modulation scheme and the coding rate are applied independently for each antenna.

11. The method of claim 10, wherein the step of rate matching is performed as a hybrid automatic request (H-ARQ) functionality.

12. The method of claim 10, wherein the independent retransmission control is performed by a hybrid automatic request (H-ARQ) scheme.

13. The method of claim 10, further comprising channel coding the each of the multiple transport blocks per each stream.

* * * * *